United States Patent [19]

Lindstam

[11] Patent Number: 4,547,385

[45] Date of Patent: Oct. 15, 1985

[54] PROCESS FOR THE PRODUCTION OF BEATABLE CREAM OF LOW FAT CONTENT

[75] Inventor: Nils C. Lindstam, Simrishamn, Sweden

[73] Assignee: Skanemejerier Ek. For., Sweden

[21] Appl. No.: 550,742

[22] Filed: Nov. 10, 1983

[30] Foreign Application Priority Data

Nov. 12, 1982 [SE] Sweden .................. 82064288

[51] Int. Cl.$^4$ ............................................. A23C 13/14
[52] U.S. Cl. .................................. 426/570; 426/586
[58] Field of Search .............. 426/586, 570, 613, 522, 426/524, 601

[56] References Cited

U.S. PATENT DOCUMENTS

| | | |
|---|---|---|
| 2,487,698 | 11/1949 | Diamond .................. 426/570 |
| 3,314,798 | 4/1967 | Graves .................. 426/586 |
| 3,468,671 | 9/1969 | Bratland .................. 426/570 |
| 3,505,077 | 4/1970 | Bratland .................. 99/63 |
| 3,883,670 | 5/1975 | Pinnings et al. .................. 426/613 |
| 3,944,680 | 3/1976 | van Pelt et al. .................. 426/586 |

FOREIGN PATENT DOCUMENTS

| | | |
|---|---|---|
| 2142077 | 3/1973 | Fed. Rep. of Germany . |
| 2326870 | 10/1977 | France .................. 426/570 |
| 6601512 | 2/1966 | Netherlands .................. 426/586 |
| 1476309 | 6/1977 | United Kingdom . |

OTHER PUBLICATIONS

Lampert Modern Dairy Products, Chem. Publ. Co., NY 1965, pp. 212-219.

*Primary Examiner*—Raymond Jones
*Assistant Examiner*—Marianne M. Cintins
*Attorney, Agent, or Firm*—Merchant, Gould, Smith, Edell, Welter & Schmidt

[57] ABSTRACT

A process for the production of a beatable cream of low fat content and high keeping quality is described. The cream is given a fat content of 17-31% by weight and will have a shelf life of up to 8 weeks when kept in cold storage. Cream having a fat content of more than 35% by weight is mixed with sweet buttermilk, tempered by alternate heating and chilling, and is then heated to a temperature above the melting point of the fat. The pH of the cream is adjusted to about 5.95-6.25 by adding sour milk or sour buttermilk, whereupon the mixture is allowed to swell. After that, it is homogenized, chilled and sterilized. After sterilization, it is again homogenized in two steps at a temperature above the melting point of the fat, whereupon it is chilled and packaged.

6 Claims, No Drawings

PROCESS FOR THE PRODUCTION OF BEATABLE CREAM OF LOW FAT CONTENT

The present invention relates to a beatable cream of low fat content and high keeping quality, and a process for the production thereof.

In recent years, many attempts have been made at producing beatable cream having a low fat content because a low fat diet is generally desired from the viewpoint of nutritional physiology. Furthermore, it is desired to be able to produce whipped cream of high keeping quality, i.e. in the order of 6 to 8 weeks.

To be beatable, natural cream must have a fat content of at least about 35% by weight. Beatable cream marketed in Sweden has a fat content of at least 40% by weight. One of the problems associated with cream of such a high fat content is that it has a poor phase stability, i.e. it deposits on the walls of the package in the form of a layer which may become compact and tough if the cream is subjected to intense agitation and admixture of air. To prevent such a phase separation, the cream can be homogenised after pasteurisation, but this reduces its beatability.

One possibility of increasing the beatability of cream having a low fat content resides in the addition of different types of emulsifiers. For instance, German Auslegeschrift No. 26 56 802 teaches the addition of a minor amount of a mixture of microcrystalline cellulose and sodium carboxy methyl cellulose. However, this technique entails the considerable disadvantage that it implies adding foreign matter to a natural product, and this is undesirable, both from the consumer's point of view and with regard to food legislation. In most parts of the world, rigorous provisions apply to food additives.

It has been established that a prerequisite of the beatability of cream is not only its fat content, but also the content of certain membrane substances which are complexes of phospholipids and proteins. Such complexes occur in natural cream. In the buttermaking process, these complexes mainly remain in the aqueous phase and therefore are present in the buttermilk, a fact that has been utilised in attempts at making beatable cream of a fat content below the accepted one. For instance, Swiss patent specification No. 530,168 teaches the production of a beatable cream or cream-like product having a fat content of at least 12% by weight by adding to fat a homogenised mixture of skim milk and buttermilk. Swedish published application No. 7300677-9 teaches a process by which a beatable cream having a fat content of 15-25% by weight is obtainable. In this prior art process, a phase disintegration is achieved of a 35% by weight cream according to the centrifugal principle in a specific apparatus, a so-called Clarifixator, whereupon a high fat fraction is centrifuged off to leave a cream having a fat content of 15-25% by weight and a higher content of membrane substance. Use is made of this process because, so far, it was not deemed possible to use buttermilk from butter production.

As has been mentioned before, another problem associated with conventional beatable cream is its low keeping quality. Beatable cream of high keeping quality has been obtained int.al. by treating ordinary beatable cream for a short period of time at a high temperature (about 140° C. for some seconds), but this cream has been unsatisfactory because of its inferior beatability and its adhesion to the package, as compared with conventional beatable cream.

The present invention makes it possible to produce a beatable cream of low fat content and high keepng quality and containing no constituents foreign to milk.

The present invention thus relates to a beatable cream of low fat content and high keeping quality, said cream being characterised in that it has a fat content of 17–31% by weight, a protein content of about 2% by weight, and a carbohydrate content of about 3% by weight. The fat content preferably is 26–30% by weight.

An especially preferred cream consists of a mixture of about 68% by weight of 40% cream, about 25% by weight of sweet buttermilk, and about 7% by weight of sour milk or sour buttermilk.

The invention also comprises a process for the production of beatable cream having a fat content of 17–31% by weight and high keeping quality, said process being characterised by (A) mixing cream with sweet buttermilk and heating and tempering it by alternate heating and chilling in the temperature range 10°–30° C., and then heating the cream to at least 60° C.;
(B) adjusting the pH of the mixture to about 5.95–6.25 by adding sour milk or sour buttermilk;
(C) allowing the mixture from (B) to swell, whereupon it is
(D) homogenised at a pressure of at most about 100 kg/cm$^2$ and a temperature of at least about 60° C.;
(E) chilled;
(F) sterilised or pasteurised, and
(G) homogenised and chilled.

Preferably, one starts from a cream having a fat content of more than 35% by weight, preferably about 40% by weight. Tempering preferably is carried out in the temperature range 10°–30° C.

The mixture preferably is pasteurised or sterilised by heating to about 140° C., whereupon it is homogenised and chilled.

In a preferred embodiment of the process, about 68% by weight of 40% cream are mixed with about 25% by weight of sweet buttermilk in step (A) and with about 7% by weight of sour milk or sour buttermilk in step (B).

The product obtained by the present invention is a low fat beatable cream. In this manner, dairies also can save large quantities of fat that may be used for e.g. buttermaking. Furthermore, use can be made of the buttermilk which otherwise usually is regarded as a by-product. Buttermilk contains about 0.7–0.8% of fat which thus can be put to use by being incorporated into a highly processed product.

As has been mentioned above, one of the great advantages of the cream according to the invention is that it contains no additives foreign to milk. Owing to the high keeping quality, at least 6 to 8 weeks, it is quite easy to keep cream at home, which is of course highly convenient. Furthermore, the cream is "lighter" and not as rich as 40% cream. A further advantage is that it cannot be whipped to excess, whereby it is easier to obtain the desired consistency of the whipped cream.

The cream according to the present invention also brings many advantages in respect to production technique. The production capacity of the dairy can be equalised and thus better utilised. This is especially advantageous on non-working days etc. Furthermore, dairies usually have a surplus of cream at the beginning of the week, and this usually results in an uneven production capacity regarding buttermaking. By the novel process of the invention, beatable cream can be produced at the beginning of the week because it has such a high keeping quality. Furthermore, production preferably starts from ordinary beatable cream having a fat content of 40%, which cream is normally produced in the dairy.

Owing to the high keeping quality of the cream, distribution and storage is simplified. Distribution can occur at longer intervals since meanwhile the cream can be stored.

The cream according to the present invention has excellent physical stability when stored at room temperature. When stored at refrigerator temperature, the product exhibits excellent physical and chemical stability for several months. The volume increase of the cream upon beating can be controlled within the range 125-225%, depending upon the manner in which the cream is pretreated, and on the final viscosity in the package.

The beatability is very good, but varies slightly depending upon the type of beater employed. So far, the best result has been obtained with a power driven wire beater. If a propeller beater (hand or power driven) is used, the beating times will be slightly longer. Beating times lie between 1 and 4 minutes, depending upon whether the whipped cream is to be used for desserts or for decorating cakes.

A further advantage is that the process of the invention uses an equipment which is standard in the dairy industry.

To start the process of the invention, conventional fat beatable cream is mixed with sweet buttermilk to increase the content of membrane substance and to dilute the fat cream. The mixture is heated and tempered by alternate heating and chilling, preferably within the temperature range 10°-30° C., and by circulation. Finally, the mixture is heated to a temperature above the melting point of the fat. This temperature is at least 60° C.

After heating, the pH of the mixture is adjusted, preferably to about 5.95 to 6.25, preferably about 6.10, by the addition of sour milk or sour buttermilk, whereupon the resulting mixture is allowed to swell.

One of the more important steps in the process according to the invention is the homogenisation according to step (D). The homogenisation imparts to the product a high physical keeping quality. Homogenisation must not be conducted too far because the product will then become too stable and thus cannot be beaten to a foam. Homogenisation should be effected under suitable pressure and temperature conditions, and it has been found that such suitable conditions are a pressure below about 100 kg/cm² and a temperature above the melting point of the fat.

After homogenisation, the product is chilled, whereupon it can be sterilised either the same day or later. Sterilisation is effected by heating to about 140° C., the buffered pH of the cream being about 6.20-6.45, preferably 6.35. After that, the cream is again homogenised and chilled preparatory to the final aseptic packaging. Homogenisation preferably is carried out in two steps at a temperature above the melting point of the fat, i.e. at least 60° C. and preferably about 72° C. Homogenisation in the first step is carried out at a pressure below 60 kp/cm², and in the second step at a pressure below 50 kp/cm².

After homogenisation, the product is chilled, preferably to below 12° C., whereupon it is tempered to about 15° C., preferably about 20° C. and then chilled again to below about 10° C. Tempering to above 15° C. can be carried out both on a packaged and an unpackaged product. The product should then preferably be kept cold for about 2 days to ripen (crystallise) prior to distribution.

It is highly surprising and not previously known that it is possible, by tempering and then homogenising the cream and then subjecting it to further pasteurisation or sterilisation, followed by homogenisation, to obtain a product of such physical stability. Conventional pasteurised 40% beatable cream has poor physical stability, as is shown by the fact that fat will adhere to the package walls already after 3 days, an adhesion that becomes definitely troublesome already after 7 days. This problem is avoided by the process of the present invention, and the fat in the cream will assume such a condition that the cream can readily be restored to suitable physical form after sterilisation.

In addition to the above-mentioned effects of the process according to the invention, an equalisation of the dependence of the fat on the time of the year is obtained.

The invention will now be described in more detail with reference to the following Example in which the percentages are given in % by weight.

EXAMPLE 675 kg of cream having a fat content of 40% were mixed with 255 kg of sweet buttermilk. For 1 hour, the mixture was repeatedly heated by circulation to 30° C., chilled to 10° C., reheated to 30° C., and chilled to 10° C. After that the temperature of the mixture was increased to 60° C., 70 kg of sour milk having a lower fat content than ordinary sour milk were added to adjust the pH to 6.05 to 6.15, and the mixture was then left to swell for 60 minutes.

After swelling, the mixture was homogenised at 60° C. and a pressure of 10 to 20 kg/cm² and was then chilled continuously to 10° C.

The cream was pumped to a steriliser where it was preheated to 80° C. Steam was injected directly into the cream to attain a sterilisation temperature of 140° C. The cream was held at this temperature for about 3-4 seconds, whereupon the temperature was lowered to 72° C. by introducing the cream into a vacuum vessel.

The cream was homogenised in two steps at a pressure of about 40 kg/cm² in the first step and a pressure of about 30 kg/cm² in the second step.

After that, the cream was chilled in a heat exchanger to a temperature of about 10° C.

Prior to aseptic packaging of the cream, the temperature was again raised in a heat exchanger to 20° C. with water having a temperature of 20° C. as heating medium. The packaged product was then placed in cold storage at a temperature of 8° C. After crystallisation (ripening) for 2 days, the cream was ready for distribution.

The resulting cream had a fat content of 27.0%, a protein content of 2.0%, a carbohydrate content of 3.3%, and a pH of 6.55.

What I claim and desire to secure by Letters Patent is:

1. A process for the production of a beatable cream having a fat content of 17 to 31% by weight and a cold storage life of about 6 to 8 weeks, comprising:

(a) mixing natural cream with sweet buttermilk and heating and tempering it by alternate heating and chilling in the temperature range 10°-30° C., and then heating the cream to at least 60° C.;

(b) adjusting the pH of the mixture to about 5.95-6.25 by the addition of sour milk or sour buttermilk;

(c) allowing the pH-adjusted mixture to swell;

(d) homogenising the swollen mixture at a pressure of no more than about 100 kg/cm² and at a temperature of at least about 60° C.;

(e) chilling the homogenised mixture;

(f) sterilising or pasteurising the mixture; and (g) homogenising and chilling the mixture.

2. The process of claim 1, wherein the natural cream is cream having a fat content of more than 35% by weight.

3. The process of claim 1, wherein the cream is sterilised by heating to 140° C. or pasteurised.

4. The process of claim 1, wherein about 68% by weight of 40% cream are mixed with about 25% by weight of sweet buttermilk in step (a) and with about 7% by weight of sour milk or sour buttermilk in step (b).

5. The process of claim 1, wherein the step (g) mixture is homogenised at a pressure below 69 kg/cm² in a first step and at a pressure below 50 kg/cm² in a second step.

6. The process of claim 1 wherein, in step (g), the mixture is chilled to below 12° C., tempered to about 15° C. and again chilled to below 10° C.

* * * * *